(12) United States Patent
Arshad et al.

(10) Patent No.: US 11,055,654 B2
(45) Date of Patent: Jul. 6, 2021

(54) PACKET DELIVERY MANAGEMENT

(71) Applicant: INTERNATIONAL BUSINESS MACHINES CORPORATION, Armonk, NY (US)

(72) Inventors: Waleed Arshad, Basingstoke (GB); Charlotte Bird, Lymington (GB); Elizabeth E. Bowen, Winchester (GB); Alexander R. G. Melkonian, Hursley (GB); Ashley Robertson, Chandlers Ford (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 15/408,679

(22) Filed: Jan. 18, 2017

(65) Prior Publication Data
US 2018/0204178 A1 Jul. 19, 2018

(51) Int. Cl.
*G06Q 10/08* (2012.01)
*H04W 4/02* (2018.01)
(Continued)

(52) U.S. Cl.
CPC ... *G06Q 10/08355* (2013.01); *G01C 21/3415* (2013.01); *H04W 4/025* (2013.01); *H04W 4/12* (2013.01); *H04W 4/021* (2013.01)

(58) Field of Classification Search
CPC ........ G06Q 10/08355; G01C 21/3415; H04W 4/025; H04W 4/12
(Continued)

(56) References Cited

U.S. PATENT DOCUMENTS 6,433,732 B1  8/2002  Dutta et al.
6,902,109 B2  6/2005  Barta et al.
(Continued)

FOREIGN PATENT DOCUMENTS

WO   WO-2014164831 A2 * 10/2014 ......... G06Q 30/0207

OTHER PUBLICATIONS

Debczak, Michelle. "Find Neighbors to Receive Your Packages With This App". Published Apr. 12, 2016. https://www.mentalfloss.com/article/78476/find-neighbors-receive-your-packages-app (Year: 2016).*

(Continued)

*Primary Examiner* — George Chen
*Assistant Examiner* — Lisa Ma
(74) *Attorney, Agent, or Firm* — Nicholas Bowman; Andrew D. Wright; Roberts Calderon Safran & Cole, P.C.

(57) ABSTRACT

A computer device and computer automated method for supporting packet delivery. A packet to be delivered has a designated delivery address and recipient. On approach of a delivery vehicle carrying the packet to the delivery address, when a geo-fence close to the delivery address is crossed, it is checked whether it is possible to deliver the packet to the designated delivery address. If it is not possible, then the method selects, conditional on sensing proximity to the designated delivery address with reference to the computing device's current location, from among one or more possible delivery addresses which have been pre-registered by the recipient as local addresses of friends an alternative delivery address at which a friend is currently located with reference to a mobile device registered to that friend. If a suitable friend who is at home is found, then the packet is delivered to the friend. The delivery is then confirmed, notifying the recipient of delivery of the packet to the alternative delivery address.

16 Claims, 6 Drawing Sheets

(51) Int. Cl.
*H04W 4/12* (2009.01)
*G01C 21/34* (2006.01)
*H04W 4/021* (2018.01)

(58) Field of Classification Search
USPC .................................................. 705/332, 338
See application file for complete search history.

(56) References Cited

U.S. PATENT DOCUMENTS

| | | | |
|---|---|---|---|
| 7,216,037 B2 | 5/2007 | Graulich et al. | |
| 7,478,140 B2 | 1/2009 | King et al. | |
| 7,487,019 B2 | 2/2009 | Estes et al. | |
| 2002/0016726 A1* | 2/2002 | Ross | G06Q 10/08 705/339 |
| 2003/0065625 A1* | 4/2003 | Rosenbaum | G06Q 10/08 705/75 |
| 2009/0012802 A1* | 1/2009 | Pinney | G06Q 10/083 705/330 |
| 2010/0205242 A1* | 8/2010 | Marchioro, II | G01C 21/3438 709/203 |
| 2011/0270714 A1 | 11/2011 | Myrick et al. | |
| 2012/0173308 A1 | 7/2012 | Brown et al. | |
| 2012/0173448 A1* | 7/2012 | Rademaker | G06Q 50/28 705/338 |
| 2013/0275326 A1* | 10/2013 | Klingenberg | G06Q 10/08 705/336 |
| 2014/0180959 A1 | 6/2014 | Gillen et al. | |
| 2015/0154559 A1* | 6/2015 | Barbush | G06Q 10/08355 705/338 |
| 2015/0347964 A1 | 12/2015 | Taylor | |
| 2016/0071051 A1 | 3/2016 | Tibbs et al. | |
| 2016/0148154 A1 | 5/2016 | Tibbs et al. | |
| 2016/0314429 A1* | 10/2016 | Gillen | G06Q 10/0833 |
| 2016/0350711 A1* | 12/2016 | Tsao | G06Q 10/0833 |
| 2017/0193442 A1* | 7/2017 | Ekkel | G06Q 50/32 |
| 2018/0174093 A1* | 6/2018 | Perez | G06Q 10/08355 |

OTHER PUBLICATIONS

Parcel—Delivery tracking for iPhone, iPad and Mac, http://parcelapp.net/, Accessed Dec. 9, 2016, 3 Pages.
Anonymous, "Self-Organizing Customer Order Pickup and Delivery via Mobile Social Networks", IP.com, Jul. 17, 2014, 6 Pages.
"The UPS Store Alternate Delivery Location", https://www.theupsstore.com/corporate-services/corporate-retail-solutions/alternate-delivery-location, Designated Shipments to the UPS Store, Accessed on Aug. 23, 2016, 3 Pages.
UPS App, https://wwwapps.ups.com/mcdp?loc=en_US, UPS My Choice—Enrollment, Upgrade, and Plan Deliveries, Accessed Dec. 9, 2016, 1 Page.
FedEx Delivery Manager, https://www.fedex.com/us/delivery/, Accessed Dec. 9, 2016, 3 Pages.
Improved Post—Image Clean Reclaim System, http://priorartip.com/IPCOM/00023787m, Accessed Dec. 9, 2016, 1 Page.

* cited by examiner

PACKET DELIVERY MANAGEMENT

BACKGROUND

The present disclosure relates to the management of packet deliveries and more particularly to systems and methods that manage delivery to alternative addresses when the recipient is not at home.

In this document "Recipient" is the person who is to take delivery of an item at a specific address. "Packet" is an item to be delivered. "Address" is a specification of a location. "Designated delivery address" is a specification of a location to which a packet has been designated to be delivered. "Alternative delivery address" is a specification of a location to which a packet may be delivered instead of the designated delivery address. "Friend" is a person who has been designated as an alternative deliveree by the recipient. "At home" means that a person is at the address associated with them for taking deliveries. "Driver" is the person or robot (e.g. drone) who is tasked with delivering items.

For domestic addresses in particular, the situation often arises that a delivery company attempts to deliver a packet to the addressee's home, but there is no-one at the home to take the delivery. In this situation, different delivery companies have different policies.

One traditional policy may include re-attempting delivery at least once, e.g. the next day.

Another traditional policy may be to attempt to deliver the packet to a neighbour, where the neighbour is informally chosen by the delivery driver at the time of delivery. When delivering to neighbors, the driver may struggle to find a neighbor who is at home and it can be time consuming and stressful. Moreover, even if the packet is left with a neighbor, the recipient may have difficulty retrieving their parcel. A modern equivalent of the neighbor policy is for the recipient to designate a neighbor at the time of making an online purchase in case he is not in to receive the packet.

Another traditional policy is to put a note through the door to indicate the failed delivery and then to deliver the packet to a packet station for customer collection. A modern equivalent of the note-through-door policy would be an electronic message (e.g. SMS, Email, Social network message) being sent to the recipient of the failed delivery and providing details of the packet station where the packet will be left. The recipient can then pick up the item from the packet station by presenting personal identification and/or the purchase receipt. A development of this is an automated packet station in which packets are left in lockers, and the recipient is given a code (e.g. a barcode) to unlock the locker and retrieve the packet.

A system of this kind provides for packet delivery to an alternative delivery location when a driver fails to deliver to the designated delivery location. The envisaged alternative delivery locations are commercial properties that are registered with the delivery company as packet stations, such as shops, fuel stations and so forth. The alternative delivery location is determined based on a combination of preferences from the delivery company and pre-registered preferences of the recipient. On delivery to the alternative delivery location, the recipient is notified.

SUMMARY

According to a first aspect of the disclosure, there a computer implemented method for supporting packet delivery including: assigning, by a computing device, a packet for delivery, the packet having a designated delivery address and recipient, and the computing device having access to positioning data giving a current location of the computing device; ascertaining, by the computing device, that it is not possible to deliver the packet to the designated delivery address; selecting, by the computing device, an alternative delivery address at which a friend is currently located with reference to a mobile device registered to that friend, wherein the selecting is based on sensing proximity to the designated delivery address with reference to the computing device's current location, and the alternative delivery address is from among one or more possible delivery addresses which have been pre-registered by the recipient as local addresses of friends; confirming, by the computing device, delivery of the packet to the alternative delivery address; and notifying, by the computing device, the recipient of delivery of the packet to the alternative delivery address.

The ascertaining may include determining, based on sensing proximity to the designated delivery address with reference to the computing device's current location, whether the recipient is currently located at the designated delivery address with reference to a mobile device registered to the recipient.

The ascertaining may include receiving input following a failed attempt to deliver at the designated delivery address.

The ascertaining may include messaging the recipient, based on sensing proximity to the designated delivery address with reference to the computing device's current location, and concluding that absent a response it is not possible to deliver the packet to the designated delivery address.

The ascertaining may include receiving input following an absence notification relating to the recipient. In this case, the recipient's absence may have been previously sent by the recipient and held in a host server, and the absence notification is first released to the computing device conditional on sensing proximity to the designated delivery address with reference to the computing device's current location.

The method may further comprise: computing a navigation route to the designated delivery address after assigning a packet for delivery; and computing a revised navigation route to the alternative delivery address after selecting an alternative delivery address.

If there are multiple alternative delivery addresses at which a friend is currently located, then one of these can be selected based on one or more of a variety of factors, such as proximity with reference at least to the computing device's current location.

According to a second aspect of the invention there is a system for supporting packet delivery. The system includes: a processor, a computer readable memory, and a computer readable storage medium associated with a computer device; program instructions for assigning a packet for delivery, the packet having a designated delivery address and recipient; program instructions for ascertaining that it is not possible to deliver the packet to the designated delivery address; program instructions for selecting an alternative delivery address at which a friend is currently located with reference to a mobile device registered to that friend, wherein the selecting is based on sensing proximity to the designated delivery address with reference to the computing device's current location, and the alternative delivery address is from among one or more possible delivery addresses which have been pre-registered by the recipient as local addresses of friends; program instructions for confirming delivery of the packet to the alternative delivery address; and program instructions for notifying the recipient of delivery of the packet to the alternative delivery address. The program instructions are stored on the computer readable storage medium for execution by the processor via the computer readable memory.

According to a second aspect of the invention there is a computer program product for delivering a packet, the computer program product comprising a computer readable storage medium having program instructions embodied therewith. The program instructions are executable by a processor to cause the processor to: provide a computing device with access to positioning data giving current location; assign a packet for delivery, the packet having a designated delivery address and recipient; ascertain that it is not possible to deliver the packet to the designated delivery address; select an alternative delivery address at which a friend is currently located with reference to a mobile device registered to that friend, wherein the selecting is based on sensing proximity to the designated delivery address with reference to the computing device's current location, and the alternative delivery address is from among one or more possible delivery addresses which have been pre-registered by the recipient as local addresses of friends; re-route to proceed to the alternative delivery address; and notify the recipient of delivery of the packet to the alternative delivery address.

BRIEF DESCRIPTION OF THE DRAWINGS

In the following, aspects of the present invention will further be described by way of example only with reference to exemplary embodiments illustrated in the figures.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1:
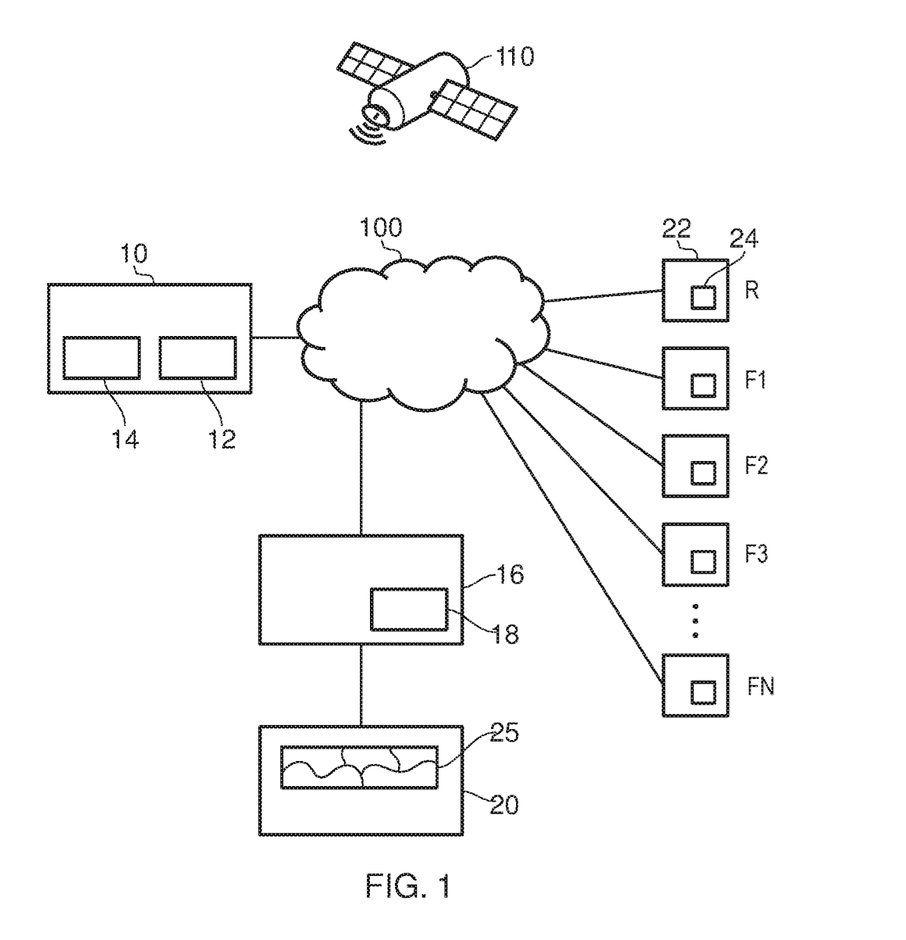
FIG. 1 is a schematic representation of the system environment of embodiments of the invention.

FIG. 1 is a schematic representation of the system environment of embodiments of the invention. A server 10 belonging to the delivery company hosts a logistics application ('app') 12, i.e. a computer program, responsible for coordinating deliveries through communication with individual delivery vehicles or delivery people. A delivery vehicle is conventionally driven by a delivery person, but in future may be a robot, such as a flying robot (drone) or a robotically driven land vehicle. The robotic vehicle may or may not be designed to function with a delivery person. In the following examples, we assume that there is either a hand-held mobile device 16 associated with the delivery person, or an equivalent mobile device 16 associated with the delivery vehicle, on which is loaded a delivery app 18, which is a computer application ('app') from the delivery company specific to delivery. It is preferable if the delivery app 18 has access to mapping software for route planning and execution, such as hosted by a satellite navigation device or smart phone or tablet. In FIG. 1, the mapping software is shown hosted by a separate navigation device 20 with display 25 which has a communication link to the delivery-managing mobile device 16. However, it will be understood that the mapping software may be co-hosted on the delivery-managing mobile device 16.

The logistics app 12 is operable to access and update a customer database 14, wherein each customer record contains customer-configurable information. The customer-configurable information includes a list of friends who live close to that customer and to whom packets may be delivered when the customer is not at home. This list of friends and its contents are described in more detail further below. The customer database 14 is illustrated as being hosted by the server 10, but in other embodiments could be hosted by a different server.

A customer who has a packet addressed to them in transit is referred to as a recipient of that packet. The recipient R has a mobile device 22 logged to their customer account. The mobile device has loaded onto it a customer app 24, which is a computer application ('app') of the delivery company for customers who are to receive deliveries from that company. Friends F1, F2 . . . FN also have respective mobile devices 22 logged to the recipient's customer account, which may or may not have loaded thereon the customer app 24.

A GPS satellite 110 is illustrated, although it will be understood that a network of GPS satellites is used for the usual triangulation to take place to any GPS-enabled device, such as devices 16, 20 and 22. It will be understood that positioning data giving current location can be obtained from one or more sources used singly or in combination. Sources include GPS (global positioning system) enabled devices, non-GPS-based vehicle tracking devices, mobile phone mast triangulation, WLAN network identification with reference to a database of known WLAN network locations, real time images referenced to a street view mapping database, a person's activity on a social network, a person's diary. In the following examples, we generally refer to GPS-enabled devices as the source of positioning data.

Each of the above-mentioned fixed and mobile devices 10, 16, 20, 22 may be operable to establish a communication link to any one of the other mobile devices either directly, e.g. Bluetooth point-to-point connection between the delivery-managing mobile device 16 and the navigation device 20, or via a network, which may be a mobile phone network, a wireless LAN, a fixed line network, any other network, and any combination thereof. Networks may include a Personal Area Network (PAN), a Local Area Network (LAN), a Metropolitan Area Network (MAN), a Wide Area Network (WAN). These networks are schematically illustrated by the cloud 100.

Figure 2:
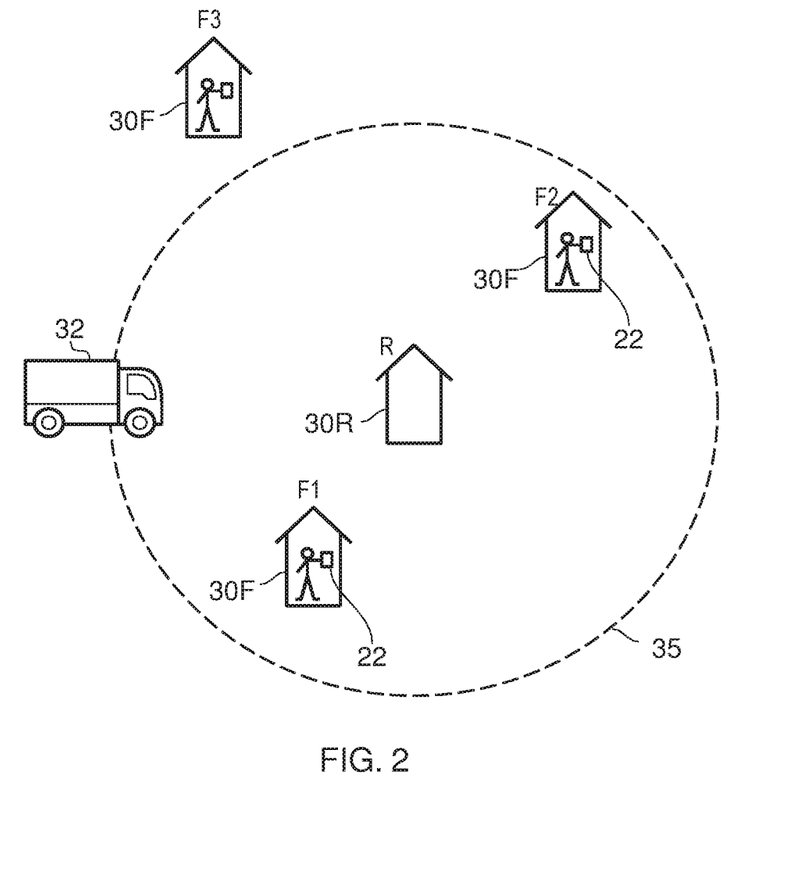
FIG. 2 is a schematic diagram showing a delivery in progress to a home in a neighborhood where the recipient and his friends live, as envisaged by embodiments of the invention.

FIG. 2 is a schematic diagram showing a delivery vehicle 32, which is in progress from a depot or previous delivery to the recipient's home 30R in order to deliver a packet. The recipient lives in a neighborhood close to other homes, including friends' homes 30F, these being friends as defined by those persons chosen to provide alternative delivery addresses in a delivery-company set up via the customer app 24. In FIG. 2, some of the friends' houses 30F are shown as having the friend who lives there being at home with the registered mobile device 22. A dashed circle 35 indicates the perimeter of a nominal area centered around the recipient's home 30R which is used for geo-fencing. The role of the geo-fenced area in the delivery process is described further below. Here we note only that the geo-fenced area could be circular as shown, i.e. defined by a radius from a center point located at the recipient's house, or may be another shape, for example a shape defined by a mapping application. A mapping application may alternatively derive the perimeter of a geo-fenced area by bounding it to the housing development in which the recipient's home is located. In another alternative, a mapping application may derive the perimeter of a geo-fenced area from a certain drive time for an arbitrary vehicle, or the delivery vehicle, from the recipient's house, e.g. 1, 2, 3, 4, 5, 10 minutes, or a certain distance as the crow flies or on the planned route. In that sense, there may be no geo-fenced area as a concept, only a single point on a virtual perimeter defined by a certain drive time or distance from the designated delivery address. It is therefore perhaps more accurate to refer to crossing a geo-fence rather than entering a geo-fenced area. What is leveraged for security reasons and also for efficiency of delivery is that the detection of whether a recipient is at home or not first becomes known to the delivery app 24 close to the time or location of delivery. Of course, if the determination of whether the recipient is at home is also delayed until close to the time or location of delivery this is more secure still than the recipient pre-registering his absence to the delivery company, and the delivery company first notifying the absence to the delivery app once the geo-fence has been crossed, since the latter approach still relies on adequate cyber security being provided on the delivery company's server.

Figure 3:
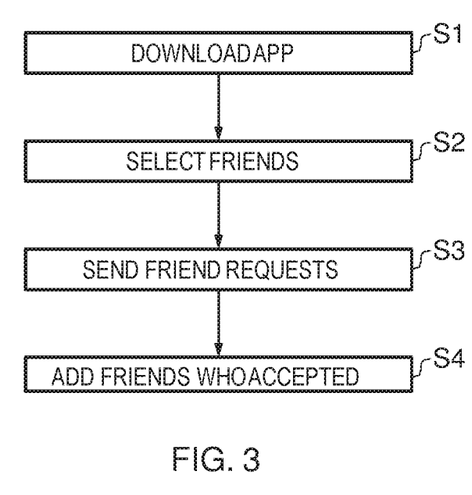
FIG. 3 is a flow diagram of a customer set-up process according to an embodiment of the invention.

FIG. 3 is a flow diagram of a customer set-up process according to an embodiment of the invention. As mentioned above, customer set up is most conveniently performed using a customer app 24 loaded onto the customer's mobile device 22. To make use of embodiments of the invention, the customer registers at least one friend to a customer account who is willing to accept packets on behalf of the customer. This is done as follows. In Step S1, the customer downloads the customer app 24 onto the mobile device 22. In Step S2, the customer identifies friends to receive packets on behalf of the customer, wherein each friend identification includes specification of a mobile phone number. In Step S3, using those mobile phone numbers, each candidate friend is messaged by the customer app 24 with a request to become a friend for the purpose of receiving packets on behalf of the requesting customer. A friend request is accepted before the candidate friend is entered as a friend onto the customer record in the database 14 located on the logistics server 10. Not only does the friend request need to be accepted, but the request includes a prompt to establish that the friend's mobile device associated with the friend's mobile phone number is GPS enabled and thus capable of being tracked. In Step S4, the friends who have accepted are added to the customer record in the database 14. The friend acceptances may be messaged via the customer's mobile device 22 or directly to the logistics server 10.

Figure 4:
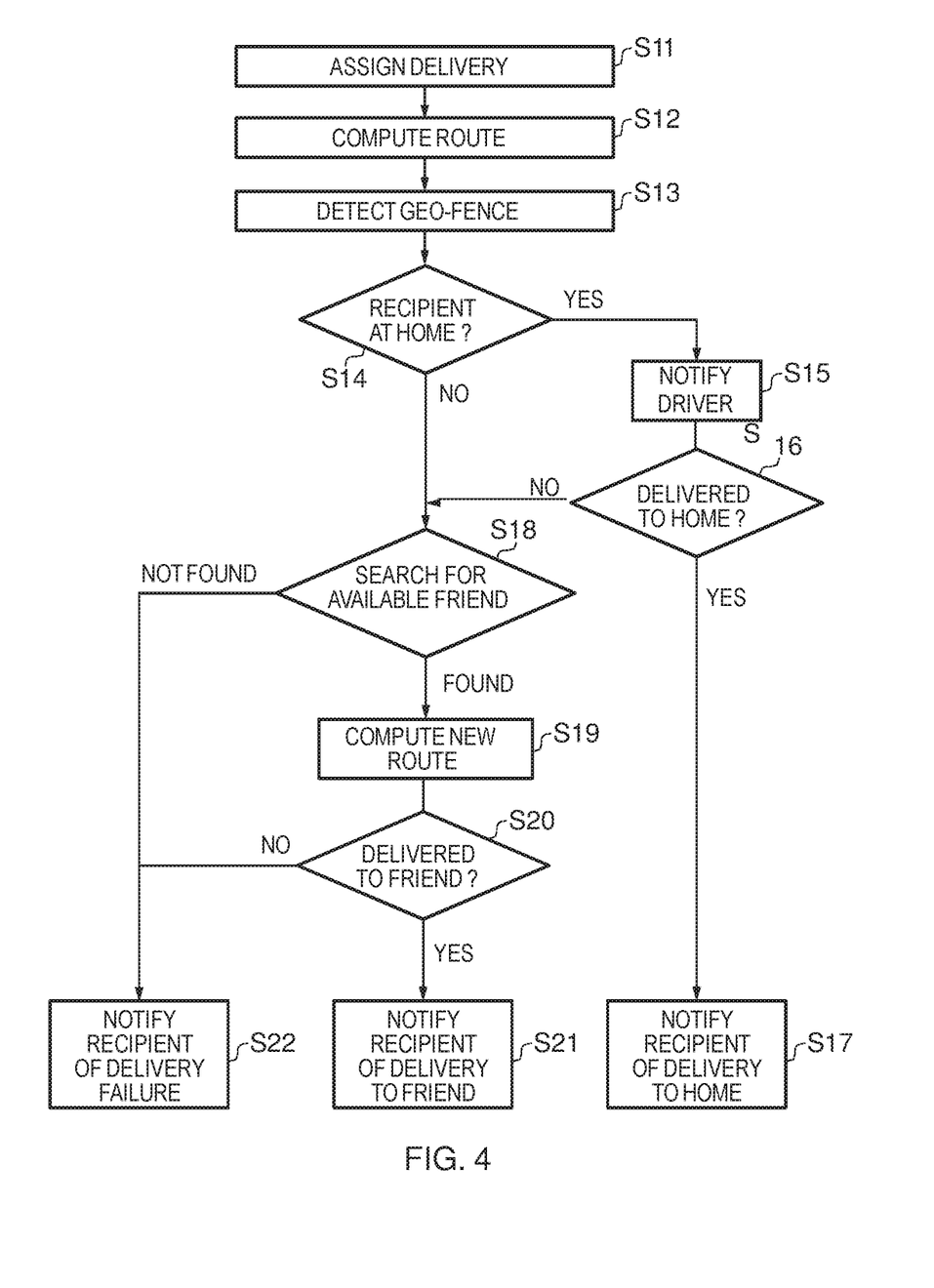
FIG. 4 is a flow diagram of the steps performed by a computer automated method embodying aspects of the invention to support a packet delivery.

FIG. 4 is a flow diagram of the steps performed by a computer automated method embodying the invention to support a packet delivery.

In Step S11, a delivery is assigned to the delivery app 18 by the logistics app 12. The delivery is to a recipient at a designated delivery address. It will be understood that the logistics app 12 will typically be assigning a whole delivery route for delivering many packets in a delivery run, but the following description is specific to a single delivery, which may be regarded as one of a delivery run, or as an isolated delivery.

In Step S12, the navigation device 20 computes a navigation route to the designated delivery address.

In Step S13, as the delivery vehicle nears the designated delivery address, the delivery app 18 senses proximity to the designated delivery address with reference to the current location of the delivery-managing mobile device 16. This is detection defined by the perimeter of the geo-fenced area 35 shown in FIG. 2.

In Step S14, triggered by crossing the geo-fence, the delivery app 18 refers to the logistics app 12 to determine co-location of the recipient's registered mobile device 22 with the recipient's home 30R. On receipt of a request for determining co-location, the logistics app 12 communicates with a mobile network provider to obtain current location of the recipient's registered mobile device 22 and compares this location with the location of the recipient's home 30R. If co-location is determined, then a communication is sent from the logistics app 12 to the delivery app 18 to indicate that the recipient is at home. It will be noted that location of the recipient's registered mobile device 22, which is a user equipment in the language of telecoms standards, may take place either through the mobile network or through a home LAN or WLAN connection. That is, even if the recipient is at home and their registered mobile device is connected to a home LAN, and the registered mobile device 22 has no mobile network reception, the recipient being at home can still be ascertained.

In Step S15, in the case of a human delivery person being present and a determination that the recipient is at home having been made in Step S14 ("YES" branch), a confirmation may be signaled via a user interface in voice and/or graphics, e.g. "recipient at home—proceed to designated delivery address".

In Step S16, the delivery person enters into the delivery device 16 when the delivery to the designated delivery address has been successful. Alternatively, this could be automatically sensed or deduced by the delivery app 18 or some other networked component, e.g. by physical separation of the packet (if the packet is fitted with an RFID tag) from the delivery vehicle.

In Step S17, the delivery app 18 communicates with the logistics app 12 to confirm delivery at the designated delivery address has taken place, and the logistics app 12 messages the recipient to pass on this information.

Step S18 follows the branch which is followed when no co-location was determined in Step S14 ("NO" branch). That is Step S14 ascertained that it was not possible to deliver the packet to the designated delivery address. In the case of a human delivery person being present, an alert may be signaled via a user interface in voice and/or graphics, e.g. "recipient not detected at home—recalculating". Depending on the extent of the geo-fenced area, Step S18 may be performed when the delivery vehicle is more or less at the designated delivery address, e.g. within 50 meters, or may be performed at some time during the approach to the designated delivery address, e.g. when entering the general neighborhood. The geo-fenced area may advantageously be sized so that it encloses all or at least a significant proportion of the alternative delivery addresses. Still in Step S18, the delivery app 18 attempts to find a friend who is at home. It does this by selecting from among one or more possible delivery addresses which have been pre-registered by the recipient as local addresses of friends an alternative delivery address at which a friend is currently located with reference to a mobile device 22 registered to that friend. The attempt to find a friend may rely on the geo-fence detection of Step S14, since this should have taken place only moments before. However, the delivery app 18 may be programmed to force another check that the delivery vehicle is within the geo-fenced area before attempting to find a friend or before delivering a result of the friend-finding attempt. In any case, the attempt to find a friend is conditional on a recent sensing of proximity to the designated delivery address with reference to the delivery device's current location. If there are multiple alternative delivery addresses at which a friend is currently located, the delivery app 18 selects one of the alternative delivery addresses based on logic programmed into the delivery app 18. One factor will be proximity with reference at least to the current location of the delivery device 16. Other factors may be included, such as the intended route to the next delivery.

Step S19 is the branch of the process that is followed if a friend is found in Step S18. The navigation device 20 computes a revised navigation route to the alternative delivery address, i.e. the friend's home 30F. Here it will be appreciated why the sizing of the geo-fenced area could be optimized to reduce the time taken for the delivery. Namely, if the delivery vehicle can be re-routed sufficiently in advance of arrival at the designated delivery address, e.g. while still on a trunk road which approaches the neighbourhood of the recipient and his friends, then the delivery vehicle will not have lost any time attempting to deliver to the designated delivery address, and will instead follow the same path as if the alternative delivery address had at the outset been the designated delivery address.

In Step S20, the delivery person enters into the delivery device 16 when the delivery to the alternative delivery address has been successful. Alternatively, this could be automatically sensed or deduced by the delivery app 18 or some other networked component, e.g. by physical separation of the packet (if the packet is fitted with an RFID tag) from the delivery vehicle.

In Step S21, the delivery app 18 communicates with the logistics app 12 to confirm delivery at the alternative delivery address has taken place, and the logistics app 12 messages the recipient to pass on this information Step S22 is the branch of the process that is followed if no friend is found in Step S18, that is no friend who is detected to be at home. In this case, the delivery app 18 communicates with the logistics app 12 that delivery has failed, and the logistics app 12 messages the recipient to pass on this information together with any supplementary information regarding the subsequent delivery process. By way of example the subsequent delivery process might involve any of the following: attempt to redeliver next day, deliver to packet station, return packet to sender, or request contact by recipient.

Having completed the description of the delivery process with reference to FIG. 4, alternative aspects of that process are now described.

The test of whether the recipient is at home as described with reference to Step S14 of FIG. 4 could be performed in several other ways to that described. However, these have in common that the test is performed inside the geo-fenced area. One alternative is simply to rely on manual input from the delivery person after a failed attempt to deliver at the designated destination address. After such an input the delivery app 18 assumes that the recipient is not at the designated destination address, since this is what it has been told by the delivery person. Another alternative is to use crossing the geo-fence as a trigger to message the recipient to ask if the recipient (or someone else) is at the designated destination address to receive the packet and only taking a positive response as a confirmation that the delivery should proceed as planned. Another alternative is to use crossing the geo-fence as a trigger for the logistics app 12 to release to the delivery app 18 an absence notification relating to absence of the recipient that was previously logged centrally, e.g. via the recipient's user account. In this alternative, the recipient can indicate their absence to the logistics app 12, which will generally be held in an anonymous secure environment, but this potentially sensitive information is withheld from the delivery person until he has entered the geo-fenced area.

Figure 5:
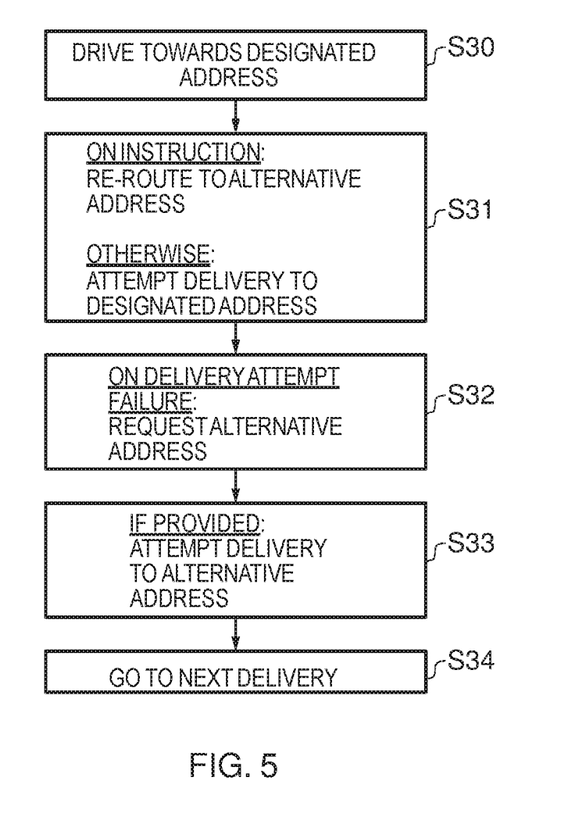
FIG. 5 is a flow diagram showing the steps of the packet delivery as performed with support of the computer automated method of FIG. 4.

FIG. 5 is a flow diagram showing the steps of the packet delivery as performed with support of the computer automated method of FIG. 4. In other words, this is the process flow from the perspective of the delivery driver or delivery vehicle.

In Step S30, the delivery vehicle proceeds towards the designated delivery address.

In Step S31, on crossing the geo-fence, the delivery vehicle is either instructed to re-route to an alternative delivery address, or continues to be instructed to proceed to the designated destination address.

In Step S32, assuming a delivery has been attempted at the designated delivery address, but fails, then an alternative destination address may be sought. The search for an alternative destination address might be triggered manually by a delivery person through input via the user interface of the delivery device 16. The search for an alternative destination address might be triggered automatically, e.g. by sensing co-location of the packet (if the packet is fitted with an RFID tag) and the delivery vehicle after the vehicle is sensed to have visited the designated delivery address and be driving away from it.

In Step S33, if an alternative destination address is found in step S32, then the delivery vehicle proceeds to that alternative destination address and delivery is again attempted.

In Step S34, the delivery vehicle then proceeds to the next delivery.

One specific modification of the method of FIG. 4 is now discussed. It may be that for reasons of policy the delivery company wishes to force one real attempted delivery to the designated destination address. In this case the method of FIG. 4 can be modified by omitting Step S14, with the process flow proceeding directly from Step S13 to Step S15. In this modification, it would also be sensible to integrate Step S13 into Step S18, that is first detect location within the geo-fenced area directly before attempting to search for friends who are at home. In this modified method, friends still have the sense of security that they are not broadcasting the fact that they are not at home in advance to the delivery company, and also the knowledge that a delivery will not be attempted unless they are at home. Friends are thus more likely to be content with the idea of being used as an alternative delivery address by the delivery company.

In the above description of a specific embodiment a certain division of tasks was elected between the logistics app 12 and the delivery app 18. It will be understood that there is free design choice in respect of many of these tasks whether they are implemented in the logistics app 12 and the delivery app 18 and all such variations are envisaged.

Figure 6:
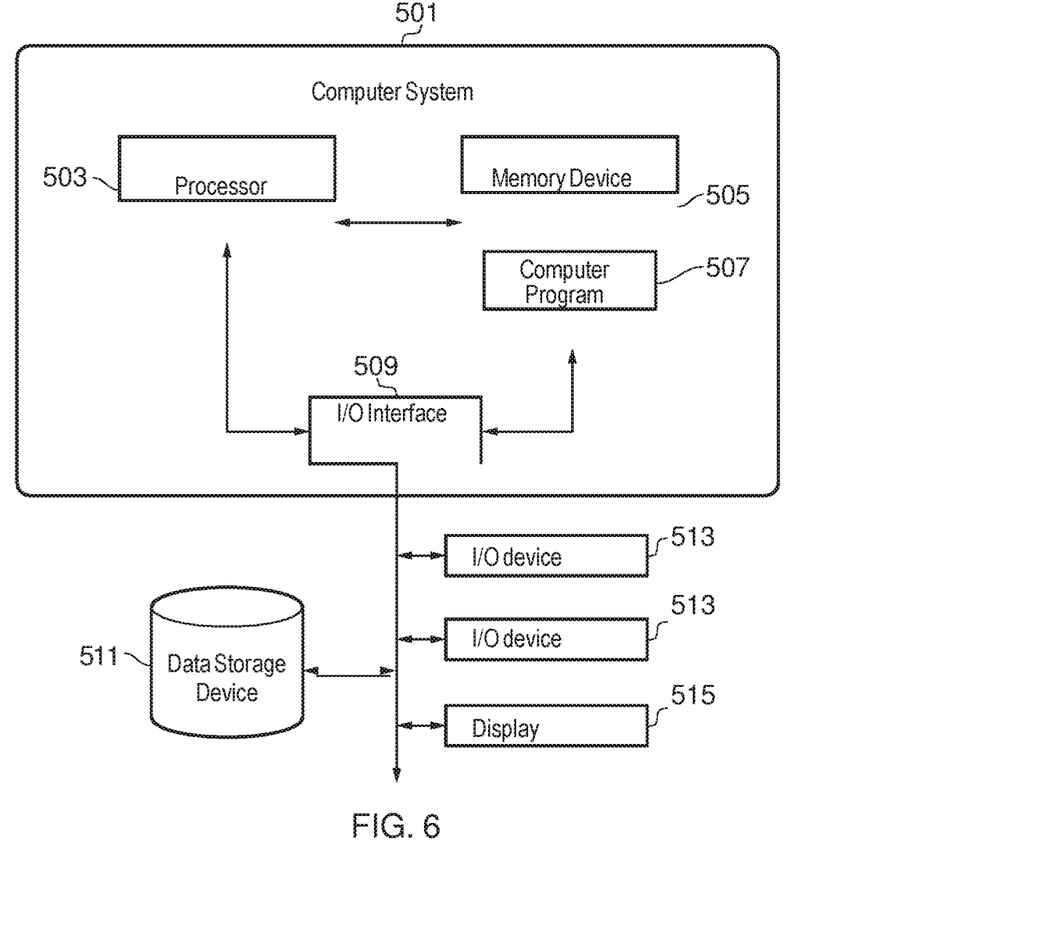
FIG. 6 shows a computer device capable of hosting computer programs embodying aspects the invention, for the delivery company, the delivery driver (or robot), or the customer.

FIG. 6 shows a structure of a computer system 501 and computer program 507 that may be used to implement the above-described methods embodying the present invention. The computer system 501 comprises a processor 503 coupled through one or more I/O Interfaces 509 to one or more hardware data storage devices 511 and one or more I/O devices 513, which can manage graphic object requests, and a display 515 on which the graphics objects can be displayed. The processor 503 may also be connected to one or more memory devices 505. At least one memory device 505 contains stored computer program 507, which is a computer program that comprises computer-executable instructions. The stored computer program 507 includes a program that implements a method for the efficient selection of runtime rules for programmable search in accordance with the present example. The data storage devices 511 may store the computer program 507. The computer program 507 stored in the storage devices 511 is configured to be executed by processor 503 via the memory devices 505. The processor 503 executes the stored computer program 507.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present disclosure.

What is claimed is:

1. A computer implemented method for supporting packet delivery, comprising:
    assigning, by a computing device, a packet for delivery, the packet having a designated delivery address and recipient, and the computing device having access to positioning data giving a current location of the computing device;
    determining, by the computing device, that a delivery vehicle is within a geo-fenced area associated with the designated delivery address, wherein the geo-fenced area is derived by a mapping application of the computing device;
    triggering, by the computing device, a remote host server to release to the computing device an absence notification previously logged with the remote host server based on the determining that the delivery vehicle is within the geo-fenced area;
    receiving, by the computing device from the remote host server, the absence notification of the recipient which is released from the host server based on the triggering;
    ascertaining, by the computing device, that it is not possible to deliver the packet to the designated delivery address based on the absence notification;
    forcing, by the computing device, another determination that the delivery vehicle is within the geo-fenced area after receiving the absence notification and before accessing a plurality of pre-registered alternative delivery addresses stored at the remote host server;
    accessing, by the computing device, the plurality of pre-registered alternative delivery addresses, wherein the accessing is contingent on the determination that the delivery vehicle is within the geo-fenced area based on the forcing the check;
    determining, by the computing device, after accessing the plurality of pre-registered alternative delivery addresses, that one of a plurality of friends of the recipient is currently located at an associated one of the alternative delivery addresses;
    selecting, by the computing device, the associated one of the alternative delivery addresses based on the determining that the one of the plurality of friends of the recipient is currently located at the associated one of the alternative delivery addresses; and
    sending, by the computing device, a communication to the host server confirming delivery of the packet to the one of the alternative delivery addresses.

2. The method of claim 1, further comprising:
    computing a navigation route to the designated delivery address after assigning a packet for delivery; and
    computing a revised navigation route to the one of the alternative delivery addresses after selecting the one of the alternative delivery addresses.

3. The method of claim 1, wherein there are multiple alternative delivery addresses at which a friend is currently located, and further comprising selecting one of the multiple alternative delivery addresses based on proximity with reference at least to the computing device's current location.

4. The method of claim 1, wherein the determining that one of the plurality of friends of the recipient is currently located at the associated one of the alternative delivery addresses is based on a location of a mobile device registered to the one of the plurality of friends of the recipient.

5. The method of claim 1, wherein the predetermined geo-fenced area encompasses a portion of the alternative delivery addresses.

6. The method of claim 1, further comprising automatically detecting, by the computing device, completion of the delivery of the packet to the one of the alternative delivery addresses utilizing a radio frequency identification tag of the packet.

7. A system for supporting packet delivery, comprising:
    a processor, a computer readable memory, and a computer readable storage medium associated with a computer device;

program instructions for assigning a packet for delivery, the packet having a designated delivery address and recipient;
program instructions to perform a first determination that the delivery vehicle is within a predetermined geo-fenced area associated with the designated delivery address prior to a release of an absence notification previously logged with a remote host server, wherein the geo-fenced area is derived by a mapping application of the computer device;
program instructions to trigger the remote host server to release to the computer device the absence notification based on the determining that the delivery vehicle is within the geo-fenced area;
program instructions to determine that it is not possible to deliver the packet to the designated delivery address based on the absence notification received from the host server;
program instructions to perform a second determination that the delivery vehicle is within the geo-fenced area after receiving the absence notification and before accessing a plurality of pre-registered alternative delivery addresses stored at the remote host server;
program instructions for accessing the plurality of pre-registered alternative delivery addresses, wherein the accessing is contingent on the determination that the delivery vehicle is within the geo-fenced area based on the forcing the check;
program instructions for determining, after accessing the plurality of pre-registered alternative delivery addresses, that one of a plurality of friends of the recipient is currently located at an associated one of the alternative delivery addresses;
program instructions for selecting the one of the alternative delivery addresses at which a friend is currently located with reference to a mobile device registered to that friend in response to the determining that it is not possible to deliver the packet to the designated delivery address; and
program instructions for sending a communication to a remote host server confirming delivery of the packet to the one of the alternative delivery addresses,
wherein the program instructions are stored on the computer readable storage medium for execution by the processor via the computer readable memory.

8. The system of claim 7, further comprising:
program instructions for computing a navigation route to the designated delivery address after assigning a packet for delivery; and
program instructions for computing a revised navigation route to the one of the alternative delivery addresses after selecting the one of the alternative delivery addresses.

9. The system of claim 7, wherein there are multiple alternative delivery addresses at which a friend is currently located, and further comprising program instructions for selecting one of the alternative delivery addresses based on proximity with reference at least to the computing device's current location.

10. The system of claim 7, wherein the determining that one of the plurality of friends of the recipient is currently located at the associated one of the alternative delivery addresses is based on a location of the mobile device registered to the friend of the recipient.

11. The system of claim 7, further comprising program instructions to automatically detect completion of the delivery of the packet to the one of the alternative delivery addresses utilizing a radio frequency identification tag of the packet.

12. The system of claim 7, wherein the geo-fenced area encompasses a portion of the alternative delivery addresses.

13. A computer program product for delivering a packet, the computer program product comprising a computer readable storage medium having program instructions embodied therewith, the program instructions executable by a processor to cause the processor to:
provide a computing device with access to positioning data giving current location;
assign a packet for delivery, the packet having a designated delivery address and recipient;
determine that the computing device is within a predetermined geo-fenced area associated with the designated delivery address prior to a release of an absence notification previously logged with a remote host server, wherein the geo-fenced area is derived by a mapping application of the computing device;
trigger the remote host server to release to the computing device the absence notification previously logged with the remote host server based on the determining that the computing device is within the geo-fenced area;
receive, from the remote host server, the absence notification of the recipient which is released from the host server based on the triggering;
ascertain that it is not possible to deliver the packet to the designated delivery address based on the absence notification;
force a second determination that the computing device is within the geo-fenced area after receiving the absence notification and before accessing a plurality of pre-registered alternative delivery addresses stored at the remote host server;
access the plurality of pre-registered alternative delivery addresses, wherein the accessing is contingent on the determination that the computing device is within the geo-fenced area based on the forcing the check;
determine, after accessing the plurality of pre-registered alternative delivery addresses, that one of a plurality of friends of the recipient is currently located at an associated one of the alternative delivery addresses;
select the one of the alternative delivery addresses based on the determining that the one of the plurality of friends of the recipient is currently located at the associated one of the alternative delivery addresses;
re-route to proceed to the one of the alternative delivery addresses; and
notify the recipient of delivery of the packet to the one of the alternative delivery addresses.

14. The computer program product of claim 13, wherein the determining that one of the plurality of friends of the recipient is currently located at the associated one of the alternative delivery addresses is based on a location of a mobile device registered to the one of the plurality of friends of the recipient.

15. The computer program product of claim 13, wherein the program instructions further cause the processor to automatically detect completion of the delivery of the packet to the one of the alternative delivery addresses utilizing a radio frequency identification tag of the packet.

16. The computer program product of claim 13, wherein the predetermined geo-fenced area encompasses a portion of the alternative delivery addresses.

* * * * *